United States Patent [19]
Fukui et al.

[11] Patent Number: 5,986,727
[45] Date of Patent: Nov. 16, 1999

[54] BACK LIGHT ILLUMINATOR FOR LIQUID CRYSTAL DISPLAY APPARATUS

[75] Inventors: Atsushi Fukui; Kanji Nishii; Kenji Takamoto; Masami Ito; Kazumasa Takata, all of Osaka, Japan

[73] Assignee: Matsushita Electric Industrial Co., Ltd., Osaka, Japan

[21] Appl. No.: 08/833,048

[22] Filed: Apr. 3, 1997

[30] Foreign Application Priority Data

Apr. 5, 1996 [JP] Japan ................................. 8-083738

[51] Int. Cl.$^6$ .......................... G02F 1/1335; F21V 7/04; F21V 9/16; B60Q 1/26
[52] U.S. Cl. ................... 349/65; 349/61; 349/67; 362/31; 362/32; 362/80.1; 362/84
[58] Field of Search .............. 362/31, 32, 80.1, 362/84; 349/61, 65, 67

[56] References Cited

U.S. PATENT DOCUMENTS 5,211,467   5/1993   Seder ........................................ 362/84
5,634,708   6/1997   Koie et al. ............................. 362/80.1

FOREIGN PATENT DOCUMENTS

5-127159   5/1993   Japan .
6-148561   5/1994   Japan .
6-250024   9/1994   Japan .

Primary Examiner—Frank G. Font
Assistant Examiner—Roy M. Punnoose
Attorney, Agent, or Firm—Merchant & Gould P.C.

[57] ABSTRACT

A back light illuminator for liquid crystal display apparatus comprises a fluorescent lamp, a light guide member, and a reflection plate enclosing the fluorescent lamp and an incident portion of the light guide member so as to reflect light rays toward the incident portion of the light guide member. The reflection plate has at least a curved portion having a parabolic cross-section or a elliptical cross-section so as not to reflect the light rays in a direction to the fluorescent lamp. Thus, absorption of reflected light by the fluorophor of the fluorescent lamp is minimized, and the luminance of the back light illuminator is increased.

10 Claims, 8 Drawing Sheets

BACK LIGHT ILLUMINATOR FOR LIQUID CRYSTAL DISPLAY APPARATUS

FIELD OF THE INVENTION

This invention relates to a back light illuminator for a liquid crystal display apparatus having high intensity light and low consumption of electric power.

DESCRIPTION OF THE PRIOR ART

Figure 8:
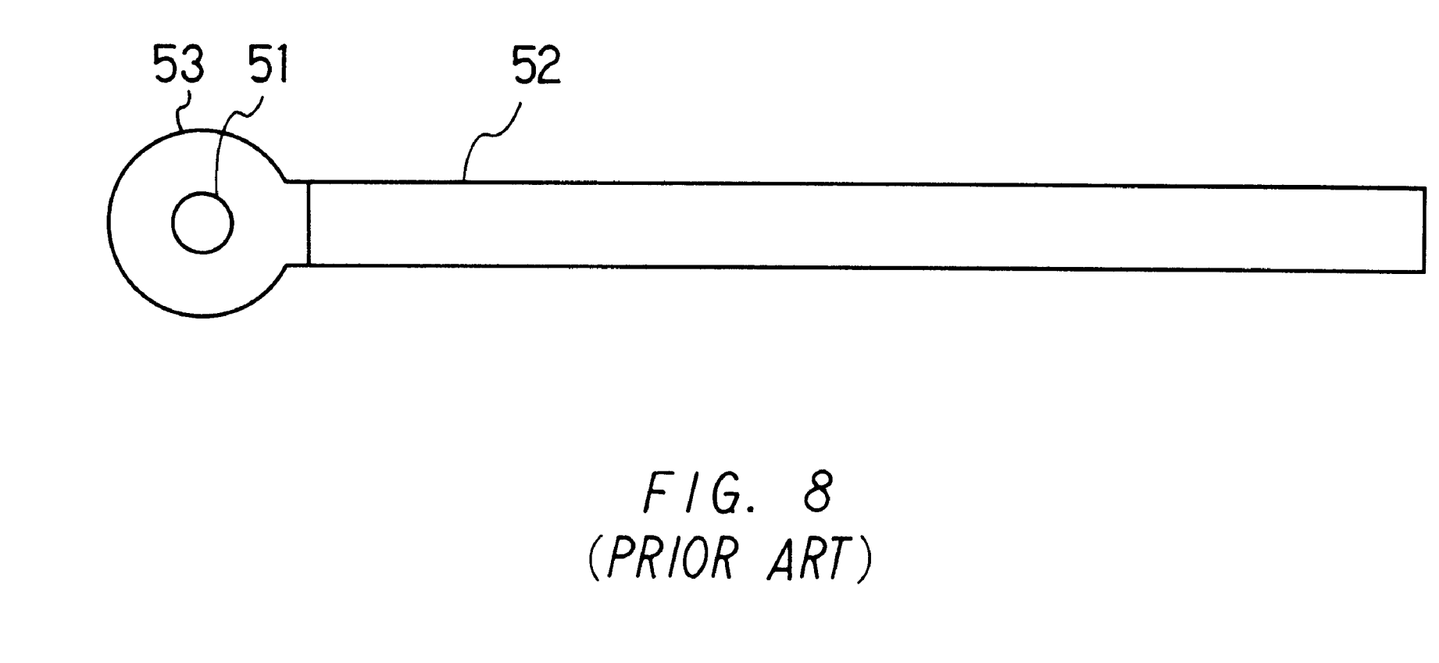
FIG. 8 is a cross-sectional side view showing a configuration of a conventional back light illuminator.

A conventional back light shown, for example, in Publication Gazette of Unexamined Japanese Patent Application Hei 5-127159 is described with reference to FIG.8. The conventional back light illuminator comprises a fluorescent lamp 51 which is a linear light source, a light guide member 52 which is formed of a transparent material and directs illumination light toward a liquid crystal display apparatus, and a reflection plate 53 having a part-tubular shape and reflecting light emitted from the fluorescent lamp 51 to an incident portion of the light guide member 52. The fluorescent lamp 51 is disposed at the center of the reflection plate 53.

A part of the light emitted from the fluorescent lamp 51 directly enters into the light guide member 52. However, most of the light emitted from the fluorescent lamp 51 is reflected by the reflection plate 53 toward the incident portion of the light guide member 52, and enters into the light guide member 52.

Since the fluorescent lamp 51 is disposed at the center of the part-tubular reflection plate 53, most of the light emitted from the fluorescent lamp 51 and reflected by the reflection plate 53 re-enters into the fluorescent lamp 51. When the light re-enters into the fluorescent lamp 51, it is absorbed by the fluorophor of the fluorescent lamp 51. Thus, the efficiency of incident light which enters into the light guide member 52 with respect to the light emitted from the fluorescent lamp 51 is low, and the luminance of the back light illuminator with respect to the consumed electric power is also low.

SUMMARY OF THE INVENTION

The purpose of this invention is to increase the luminance of the back light illuminator for the liquid crystal display apparatus and to reduce the consumption of the electric power of the back light illuminator by increasing the efficiency of incident light that is emitted from the linear light source such as the fluorescent lamp and enters into the incident portion of the light guide member.

A first back light illuminator for liquid crystal display apparatus of this invention comprises a linear light source, a light guide member directing light emitted from the light source toward a liquid crystal display panel, and a reflection plate for reflecting light emitted from the light source to an incident portion of the light guide member. The incident portion of the light guide member is formed to be a wedge shape having a first face and a second face crossing at an acute angle. The light source is disposed to face the first face of the incident portion of the light guide member. The reflection plate has a parabolic portion having a parabolic cross-section for reflecting the light emitted from the light source toward the first face of the incident portion of the light guide member.

Since the reflection plate has the parabolic portion having the parabolic cross-section, the light emitted from the light source and reflected by the parabolic portion moves outward in comparison with the light reflected by the conventional part-tubular reflection plate. Thus, the amount of light re-entering into the light source after being reflected by the reflection plate is reduced, so that the efficiency of light entering into the light guide member with respect to the light emitted from the light source increases. Consequently, the luminance of the back light illuminator is increased. Alternatively, the consumption of electric power by the back light illuminator is reduced when the required luminance of the back light illuminator is constant.

In the above-mentioned first configuration of the back light illuminator, it is preferable that the first face and the second face of the incident portion of the light guide member cross at a first angle in a range of 5 to 30 degrees. When the first face and the second face cross at such a small acute angle, the thickness of the light guide member is made thin. Consequently, the back light illuminator for liquid crystal display apparatus is made thin.

Alternatively, in the first configuration, it is preferable that the axis of symmetry of the parabolic portion of the reflection plate and the normal on the first face of the incident portion of the light guide member cross at a second angle in a range of 5 to 30 degrees. By such a configuration, the length of the light guide member is shortened. Consequently, the back light illuminator is downsized.

Furthermore, when the first angle between the first face and the second face is θ, the second angle between the axis of symmetry of the parabolic portion and the normal on the first face is ø, and the refraction index of light of a material of the light guide member is n, it is preferable that the following formula be satisfied;

$$\sin\phi > n \times \sin(\sin^{-1}(1/n) - 2\theta).$$

By such a configuration, the light entering into the incident portion of the light guide member is totally reflected in the light guide member after being reflected by the wedge shaped faces of the incident portion no more than twice. Thus, loss of light is minimized and the luminance of the back light illuminator is increased.

Furthermore, in the first configuration, it is preferable that the focus of the parabolic portion of the reflection plate be disposed at the center of the light source. By such a configuration, the light emitted from the light source and reflected by the parabolic portion of the reflection plate enters into the incident portion of the light guide plate in a direction parallel to the axis of symmetry of the parabolic portion. Thus, the amount of the light re-entering into the light source reduces, and efficiency of the incident light entering into the light guide member with respect to the light emitted from the light source increases. Consequently, the luminance of the back light illuminator increases.

On the other hand, a second back light illuminator for liquid crystal display apparatus of this invention also comprises a linear light source, a light guide member exiting light emitted from the light source toward a liquid crystal display panel, and a reflection plate for reflecting light emitted from the light source to an incident portion of the light guide member. The light source is disposed for facing the center of an incident face of the light guide member. The reflection plate has a pair of elliptical portions formed substantially symmetrical to the perpendicular at the center of the incident face of the light guide member for reflecting the light emitted from the light source toward the incident face of the light guide member. Each elliptical portion has a cross-section formed by a curve constituting an ellipse and the major axis of the ellipse is substantially parallel to the the incident face of the light guide member.

Since the reflection plate is formed substantially symmetrical to the perpendicular at the center of the incident face of the light guide member and the cross-sectional shape of the reflection plate is the elliptical curve, the light emitted from the light source and reflected by the reflection plate moves outward in comparison with the case that the light is reflected by the part-tubular reflection plate. Thus, the amount of light re-entering into the light source after being reflected by the reflection plate is reduced, so that the efficiency of light entering into the light guide member per the light emitted from the light source increases. Consequently, the luminance of the back light illuminator will be increased. Furthermore, consumption of electric power by the back light illuminator will be reduced.

In the above-mentioned second configuration of the back light illuminator, it is preferable that a first focus of each elliptical portion be disposed at the center of the light source and a second focus of each elliptical portion be disposed outside the light source. By such a configuration, the light emitted from the reflection plate and reflected by the elliptical portion moves toward the second focus disposed outside the light source. The amount of light re-entering into the light source after being reflected by the reflection plate is reduced, so that the efficiency of light entering into the light guide member with respect to the light emitted from the light source increases. Consequently, the luminance of the back light illuminator will be increased.

Furthermore, in each of the above-mentioned configurations, it is preferable that protrusions be provided on a surface of the light guide member or the reflection plate facing the light source so as to protrude toward the light source. By such a configuration, the light source does not directly contact the light guide member or the reflection plate. Thus, the heat of the light source does not irradiate the light guide member or the reflection plate so much. Consequently, reduction of the temperature of the light source is minimized and reduction of the light from the light source is minimized.

DETAILED DESCRIPTION OF THE INVENTION

First Embodiment

A first embodiment of a back light illuminator for a liquid crystal display apparatus is now described with reference to FIGS. 1 to 4. The back light illuminator shown in FIG. 1 comprises a fluorescent lamp 1 which is a linear light source, a light guide member 2 which is made of, for example, polycarbonate (having refraction index of light n=1.59) and directs light toward a liquid crystal display panel (not shown in the figure), and a reflection plate 3 for reflecting light emitted from the fluorescent lamp 1 toward an incident portion 4 of the light guide member 2. Protrusions 5 are provided between the incident portion 4 of the light guide member 2 and the fluorescent lamp 1.

Figure 1:
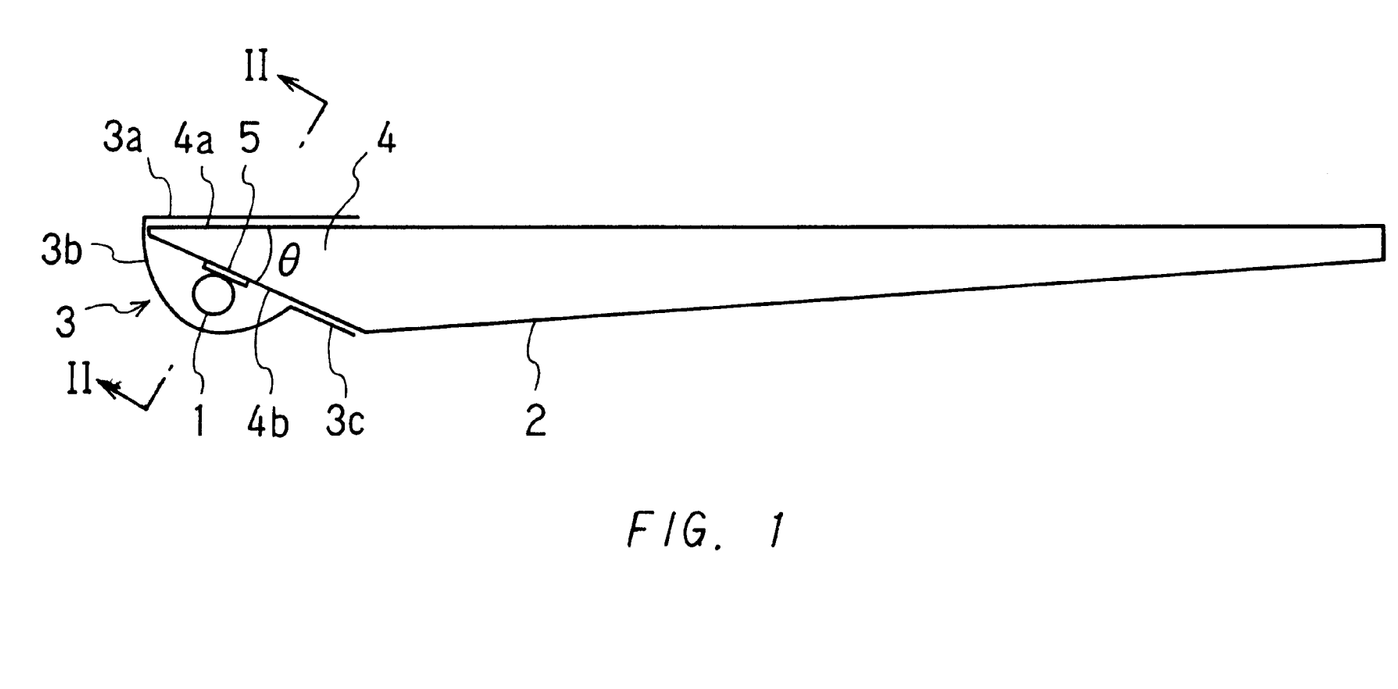
FIG. 1 is a cross-sectional side view showing a configuration of a first embodiment of a back light illuminator for a liquid crystal display apparatus of this invention.

The incident portion 4 of the light guide member 2 has a first face 4a which is parallel to the liquid crystal display panel and a second face 4b that is oriented with respect to the first face 4a at an angle $\theta$ so as to form a wedge shape. The reflection plate 3 includes a first straight portion 3a which is formed to be parallel to the first face 4a of the incident portion 4 of the light guide member 2, a parabolic portion 3b which is formed so as to enclose the fluorescent lamp 1 and has a parabolic cross-section, and a second straight portion 3c which is formed to be parallel to the second face 4b of the incident portion 4 of the light guide member 2. In FIG. 1, gaps are illustrated between the light guide member 2 and the reflection plate 3 for convenience in the drafting. However, it is preferable that the reflection plate 3 closely contact the light guide member 2 so as not to leak light between the gaps.

Figure 2:
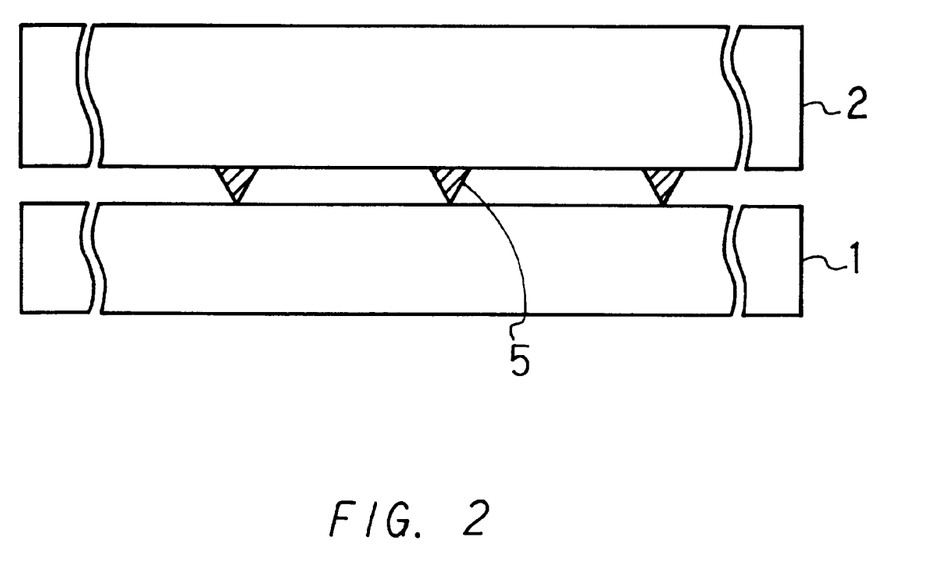
FIG. 2 is a cross-sectional view taken along line II—II of the back light illuminator shown in FIG. 1.

As can be seen from FIG. 2, each protrusion 5 has a triangle shaped cross-section and disposed in the vicinity of the center of the fluorescent lamp 1 in the lengthwise direction thereof. Thus, the fluorescent lamp 1 does not directly contact the light guide member 2. It is preferable that protrusions (not shown in the figure) be further provided between the reflection plate 3 and the fluorescent lamp 1 in the vicinity of the center of the fluorescent lamp 1 so that the fluorescent lamp 1 does not contact the reflection plate 3 directly.

Generally, the intensity of emission of the fluorescent lamp varies corresponding to the temperature. The lower the temperature of the fluorescent lamp is, the smaller the intensity of the emission of the fluorescent lamp. If an area of the fluorescent lamp 1 contacting the light guide member 2 or the reflection plate 3 were larger, the heat due to the emission of the fluorescent lamp 1 would be absorbed by the light guide member 2 or the reflection plate 3, so that the intensity of the emission of the fluorescent lamp would be reduced due to the reduction of temperature. However, the protrusions 5 contact the fluorescent lamp 1 at points. Thus, the reduction of temperature of the fluorescent lamp 1 is not so large. The reduction of emission of the fluorescent lamp 1 is minimized.

Generally, the fluorescent lamp is largely deformed due to warp in the vicinity of the center thereof in the lengthwise direction. However, the protrusions 5 are provided in the vicinity of the center of the fluorescent lamp 1, so that the protrusions 5 minimize the warp of the fluorescent lamp 1.

Figure 3:
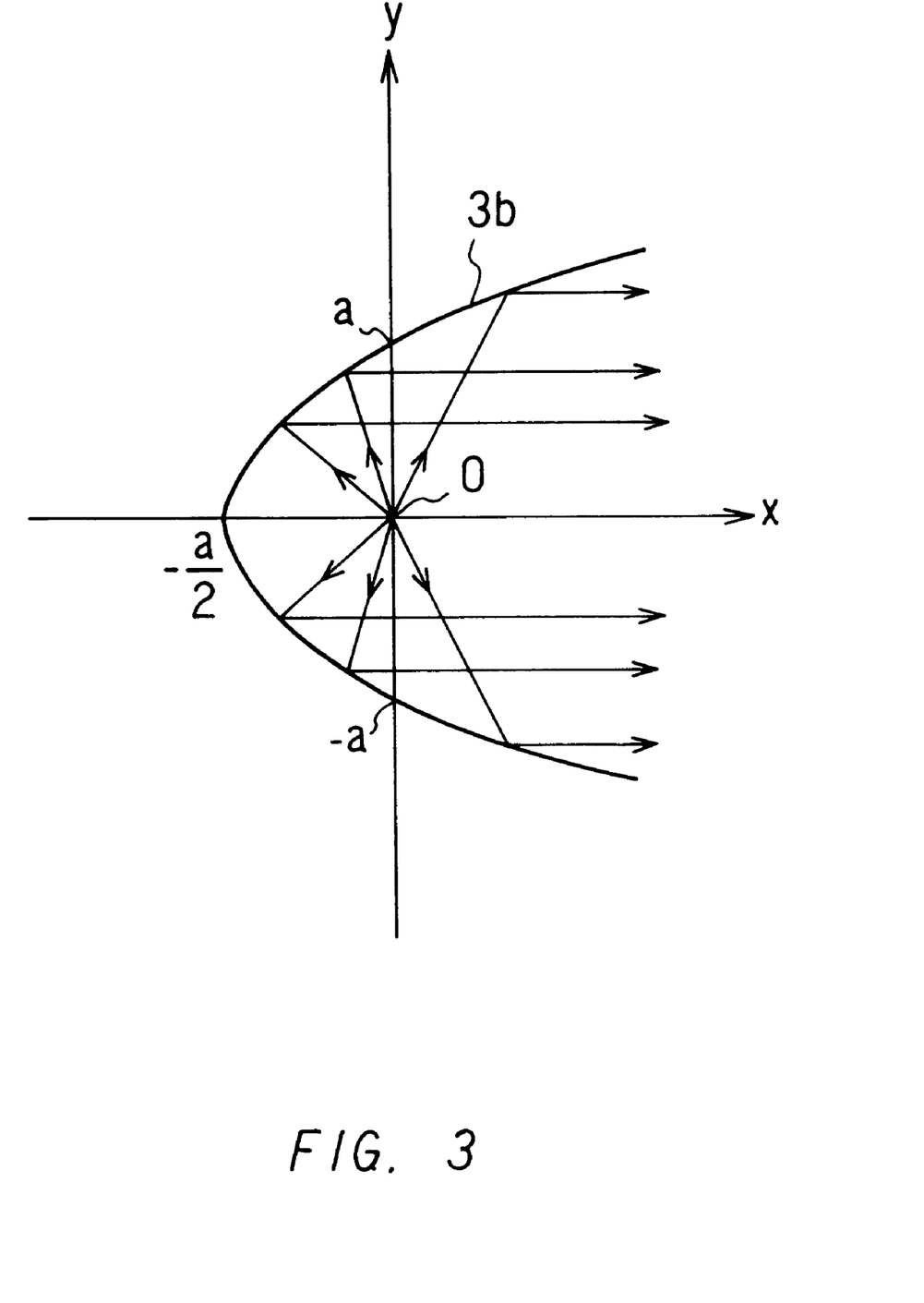
FIG. 3 is a drawing showing optical paths of light rays reflected by the reflection plate in the first embodiment.

Optical paths of light rays reflected by the parabolic portion 3b of the reflection plate 3 are described with reference to FIG. 3. In FIG. 3, the focus O of the parabolic portion 3b of the reflection plate 3 is defined as the origin. The symmetry axis of the parabolic portion 3b is oriented to be parallel to x-axis. The parabola of the parabolic portion 3b is shown by the following equation;

$$a^2+2ax=y^2$$

As can be seen from FIG. 3, the light rays emitted from the focus O of the parabola are reflected by the parabolic portion 3b of the reflection plate and move in a direction parallel to the x-axis.

Figure 4:
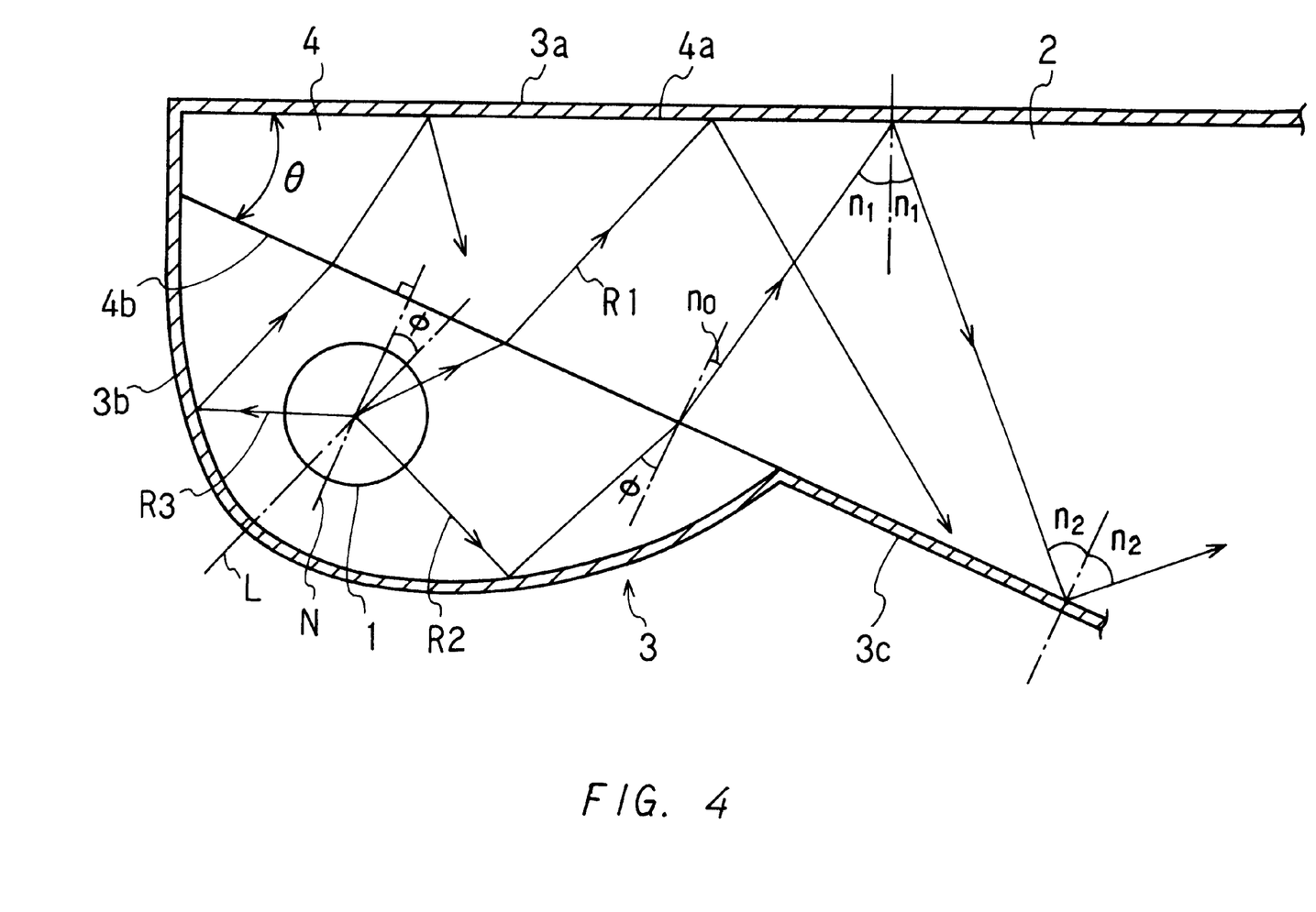
FIG. 4 is an enlarged partial cross-sectional side view showing optical paths of light rays emitted from a light source and entering into a light guide member in the first embodiment.

Optical paths of light rays emitted from the fluorescent lamp 1 are described with reference to FIG. 4. In FIG. 4, the focus of the parabolic portion 3b of the reflection plate 3 is disposed at the center of the fluorescent lamp 1. The symmetry axis L of the parabolic portion 3b of the reflection plate 3 intersects the normal N on the second face 4b of the incident portion 4 of the light guide member at an angle ø.

Since the reflection plate 3 is configured as illustrated in FIG. 4, the light rays emitted from the fluorescent lamp 1 and reflected by the parabolic portion 3b of the reflection plate 3 are incident on the second face 4b of the incident portion 4 of the light guide member 2 at an incident angle ø with respect to the normal on the second face 4b.

In FIG. 4, a light ray R1, which is emitted from the fluorescent lamp 1 and is directly incident on righthand region with respect to the normal N on the second face 4b, moves in the righthand direction in the light guide member 2 where the distance between the first face 4a and the second face 4b gradually increases. The incident angle of the light ray R1 on the second face 4b becomes larger with every reflection by the second face 4b. Consequently, the light ray R1 moves toward an exit portion of the light guide member 2 by repeating total reflection.

On the other hand, a light ray not shown in FIG. 4, which is emitted from the fluorescent lamp 1 and directly incident on lefthand region of the normal N on the second face 4b, moves in the lefthand direction in the light guide member 2 where the distance between the first face 4a and the second face 4b gradually decreases. The incident angle of the light ray on the second face 4b becomes smaller with every reflection by the second face 4b. Finally, the light ray exits from the light guide member 2. However, the light exited from the light guide member 2 is reflected by the parabolic portion 3b of the reflection plate 3 and re-enters into the light guide member 2. The light ray re-entering into the light guide member 2 moves in the righthand direction in the light guide member 2 toward an exit portion of the light guide member 2 by repeating total reflection.

Since the focus of the parabolic portion 3b of the reflection plate 3 is disposed at the center of the fluorescent lamp 1, light rays R2 and R3, which are emitted from the fluorescent lamp 1 and reflected by the parabolic portion 3b of the reflection plate 3, enter into the incident portion 4 in a direction substantially parallel to the symmetry axis L of the parabolic portion 3b. Hereupon, the symmetry axis L of the parabolic portion 3b of the reflection plate 3 crosses the normal N on the second face 4b of the incident portion 4 of the light guide member at the angle ø, so that the light rays R2 and R3 reflected by the parabolic portion 3b of the reflection plate 3 are incident on the second face 4b of the incident portion 4 of the light guide member 2 with the incident angle ø. When the refraction index of light of the material of the light guide member 2 is n, since Snell's law is shown by the following equation;

$$\sin ø = n \times \sin \eta_0,$$

the exit angle $\eta_0$ into the light guide member 2 is shown by the following equation;

$$\eta_0 = \sin^{-1}\{(\sin ø)/n\}.$$

When the light entering into the light guide member 2 with the incident angle ø with respect to the second face 4b is incident on the first straight portion 3a of the reflection plate 3, an incident angle $\eta_1$ with respect to the first straight portion 3a is shown by the following equation;

$$\eta_1 = \eta_0 + \theta.$$

When the incident angle $\eta_1$ is smaller than the total reflection angle $\kappa = \sin^{-1}(1/n)$, the light rays reflected by the first straight portion 3a exit from the light guide member 2, but they are reflected by the parabolic portion 3b of the reflection plate 3 and re-enter into the light guide member 2. When the light rays incident on the first straight portion 3a of the reflection plate 3 with the incident angle $\eta_1$ are incident on the second straight portion 3c of the reflection plate 3, an incident angle $\eta_2$ with respect to the second straight portion 3c is shown by the following equation;

$$\eta_2 = \eta_1 + \theta.$$

That is, the incident angle with respect to the second face 4b is added by θ in every reflection. When an incident angle $\eta_n$ at the n-th reflection is shown by the following equation;

$$\eta_n = \eta_0 + n\theta.$$

The light ray incident on the first face 4a or the second face 4b with an incident angle smaller than the total reflection angle κ exits from the light guide member 2 and is reflected by the first or second straight portion 3a or 3c so as to re-enter into the light guide member 2. Reflectance in total reflection is substantially 100%. However, reflectance by the reflection plate 3 is smaller than 100%. Loss of the light moving in the light guide member 2 by total reflection is smaller than that of the light moving by the reflection of the reflection plate. Thus, the light moving by total reflection can increase the luminance of the back light illuminator.

In order to totally reflect the light within twice reflections in the incident portion 4 of the light guide member 2, it is necessary to satisfy the formula of $\eta_2 > \kappa$. Since, $$\eta_2 = \eta_0 + 2\theta$$

and $$\eta_0 = \sin^{-1}\{(\sin ø)/n\},$$

the angle ø between the symmetry axis L of the parabolic portion 3b of the reflection plate 3 and the normal N on the second face 4b of the incident portion 4 of the light guide member 2 should satisfy the following formula;

$$\sin ø > n \times \sin(\kappa - 2\theta).$$

For example, when the refraction index n of light of the material of the light guide member 2 is equal to 1.59 and the angle θ between the first face 4a and the second face 4b is 10 degrees (θ=10°), the angle ø should be larger than 31 degrees (ø>31°). When the angle θ is equal to 15 degrees (θ=15°), the angle ø should be larger than 14 degrees (ø>14°).

The larger the angle θ between the first face 4a and the second face 4b of the incident portion of the light guide member 2 is, the smaller the number of reflections of light in the light guide member 2 for satisfying the condition of total reflection. However, the light guide member 2 becomes thick. Alternatively, the larger the angle ø between the symmetry axis 1, of the parabolic portion 3b of the reflection plate 3 and the normal N on the second face 4b of the incident portion 4 of the light guide member 2 is, the smaller the number of reflections of light in the light guide member 2 for satisfying the condition of total reflection. However, the reflection plate 3 becomes long. In order to make the light guide member 2 thin and small, it is preferable that the angle θ be in a range of 5 to 30 degrees. Alternatively, it is preferable that the angle ø be in a range of 5 to 30 degrees.

In the above-mentioned first embodiment of the back light illuminator of this invention, the incident portion 4 of the light guide member 2 has the wedge shape and the parabolic portion 3b is formed on the reflection plate 3 for enclosing the fluorescent lamp 1, so that the light emitted from the fluorescent lamp 1 effectively enters into the light guide member 2. Consequently, high-luminance of the back light illuminator is realized. Alternatively, when the luminance of the back light illuminator is fixed, the consumption of electric power is reduced, and the back light illuminator can be used for a long time.

Second Embodiment

Figure 5:
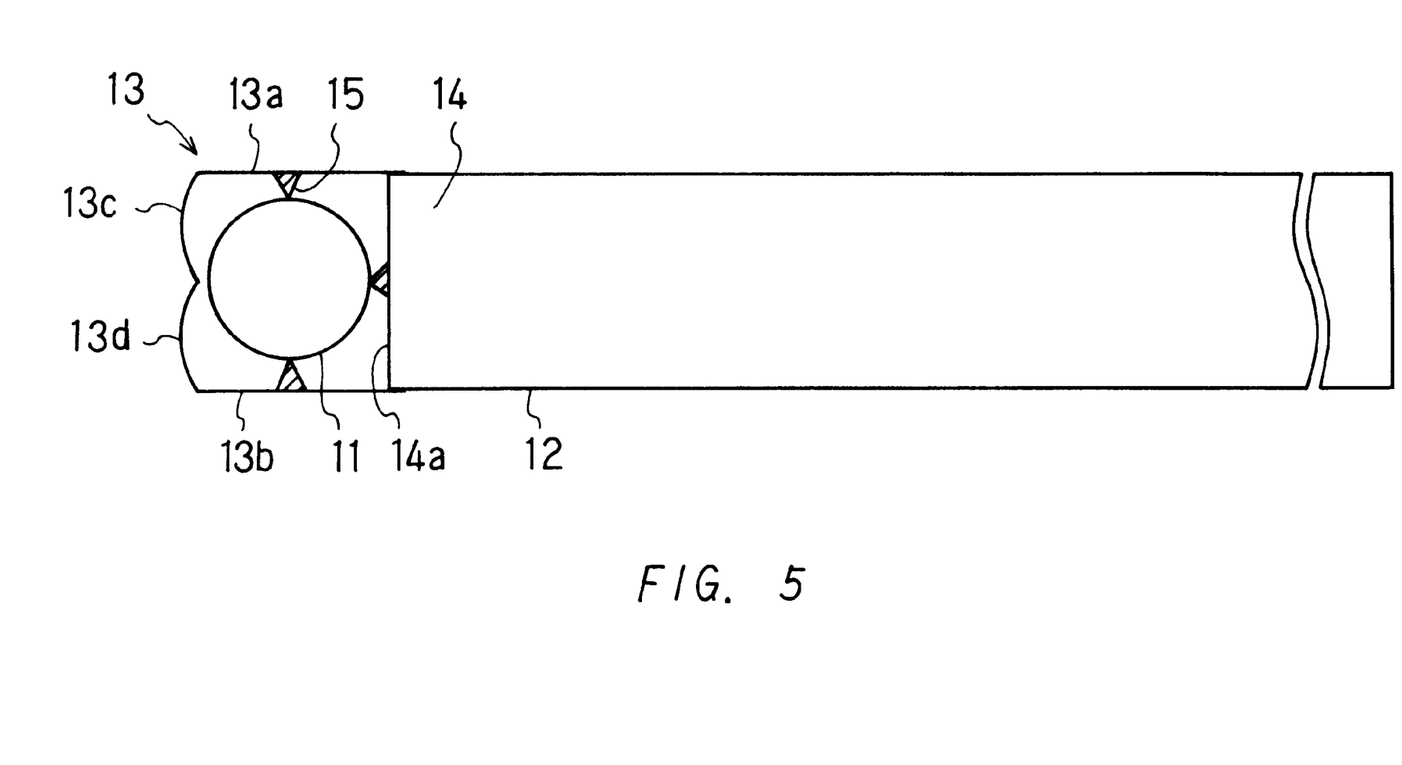
FIG. 5 is a cross-sectional side view showing a configuration of a second embodiment of a back light illuminator for a liquid crystal display apparatus of this invention.
Figure 6:
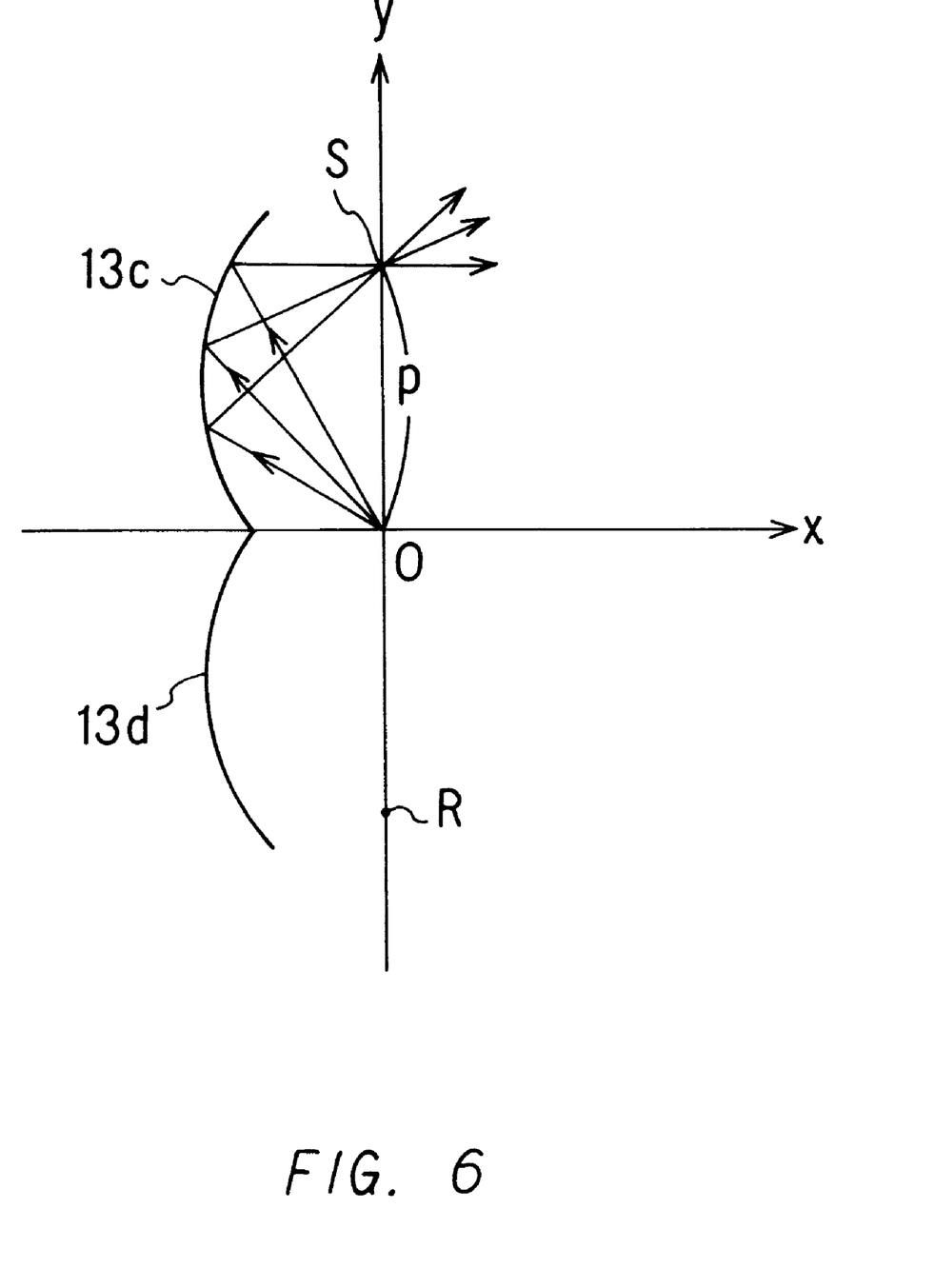
FIG. 6 is a drawing showing optical paths of light rays reflected by the reflection plate in the second embodiment.
Figure 7:
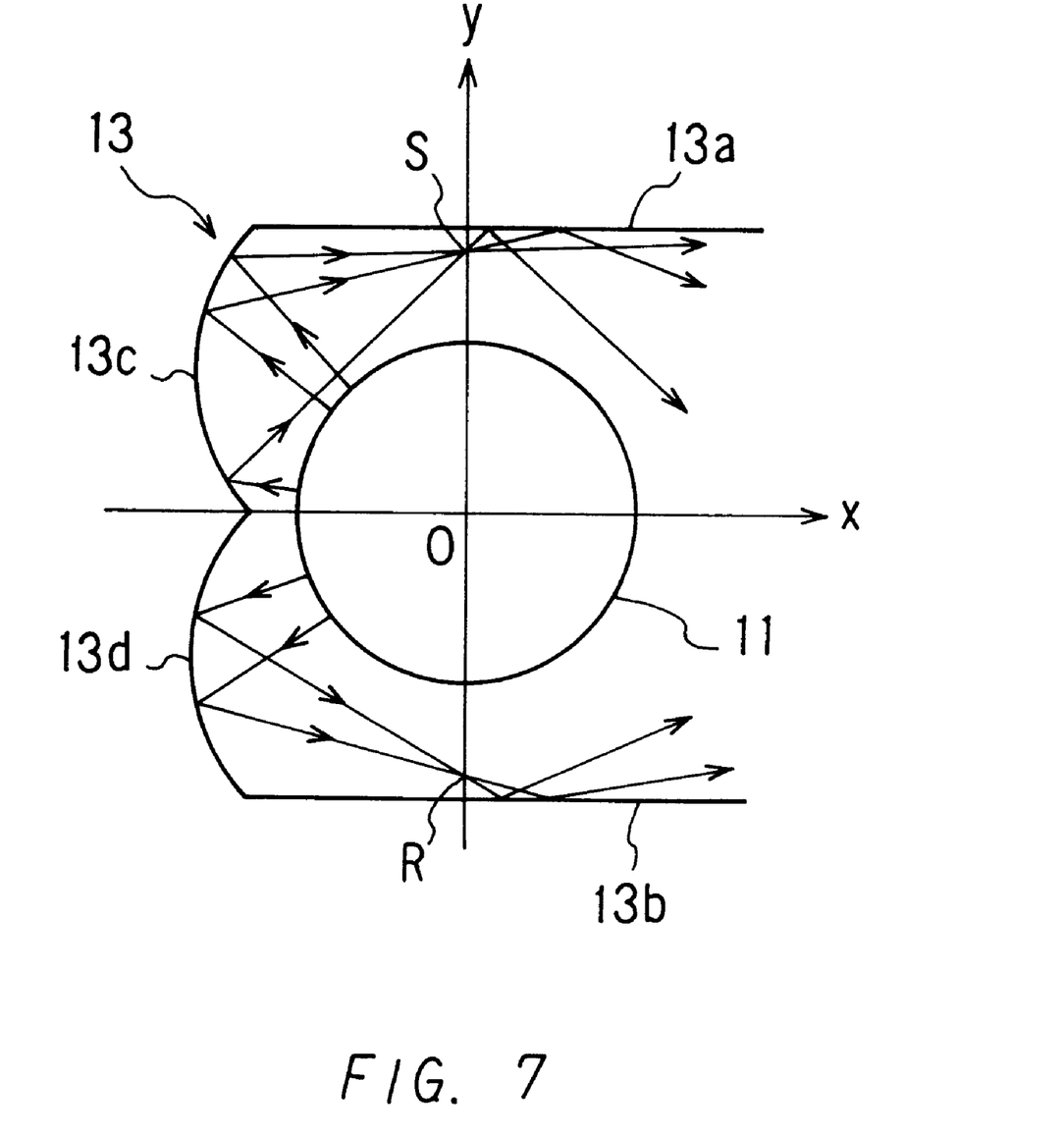
FIG. 7 is an enlarged partial cross-sectional side view showing optical paths of light rays emitted from a light source and entering into a light guide member in the second embodiment.

A second embodiment of a back light illuminator for a liquid crystal display apparatus is now described with reference to FIGS. 5 to 7. The back light illuminator shown in FIG. 5 comprises a fluorescent lamp 11 which is a linear light source, a light guide member 12 which is made of, for example, polycarbonate (having refraction index of light n=1.59) and directs light toward a liquid crystal display panel (not shown in the figure), and a reflection plate 13 for reflecting light emitted from the fluorescent lamp 11 toward an incident portion 14 of the light guide member 12. Protrusions 15 are provided between the incident portion 14 of the light guide member 12 and the fluorescent lamp 11 and between the reflection plate 13 and the fluorescent lamp 11.

The light guide member 12, especially, the incident portion 14 has a rectangular cross-section. The fluorescent lamp 11 is disposed for facing an incident face 14a of the incident portion 14 of the light guide member 12. The reflection plate 13 includes first and second straight portions 13a and 13b opposing each other, and first and second elliptical portions 13c and 13d formed between the first and second straight portions 13a and 13b. The first and second elliptical portions 13c and 13d are substantially symmetrically formed with respect to the perpendicular (x-axis in FIG. 6) at the center of the incident face 14a of the incident portion 14. The first elliptical portion 13c is disposed between an end of the first straight portion 13a and the center of the fluorescent lamp 11. The second elliptical portion 13d is disposed between an end of the second straight portion 13b and the center of the fluorescent lamp 11. The major axes of the first and second elliptical portions 13c and 13d are substantially parallel to the incident face 14a of the incident portion 14 of the light guide member 12.

The protrusions 15 having triangle cross-section are respectively formed at positions facing the center of each outside face of the fluorescent lamp 11. Thus, the fluorescent lamp 11 does not directly contact not only the incident face 14a of the incident portion 14 of the light guide member 12 but also the first and second straight portions 13a and 13b of the reflection plate 13. The protrusions 15 contact the fluorescent lamp 11 at points. Thus, the reduction of temperature of the fluorescent lamp 11 is not so large. The reduction of emission of the fluorescent lamp 11 is minimized. Furthermore, the protrusions 15 are provided in the vicinity of the center of the fluorescent lamp 11, so that the protrusions 15 minimize the warp of the fluorescent lamp 11.

Optical paths of light rays reflected by the first elliptical portion 13c of the reflection plate 13 are described with reference to FIG. 6. In FIG. 6, the symmetry axis of the first and second elliptical portions 13c and 13d is defined as the x-axis. The first focus of the first elliptical portion 13c of the reflection plate 13 is defined as origin O. The second focus of the first elliptical portion 13c is disposed at a position S on the y-axis at a distance p from the origin O. The first focus of the second elliptical portion 13d of the reflection plate 13 is positioned at the origin O. The second focus of the second elliptical portion 13d is disposed at a position R on y-axis with a distance −p from the origin O. When the radius vector of the ellipse is defined as c, the ellipse of the first elliptical portion 13c is shown by the following equation;

$$\{x/(c^2-4p^2)\}^2+\{(y-c)/c\}^2=0.25.$$

Light rays, which are emitted from the first focus O of the first elliptical portion 13c (that is the origin O) and directed to the first elliptical portion 13c, are reflected by the first elliptical portion 13c of the reflection plate 13 and pass through the second focus S of the first elliptical portion 13c. Similarly, light rays not shown in the figure, which are emitted from the first focus O of the second elliptical portion 13d and directed to the second elliptical portion 13d, are reflected by the second elliptical portion 13d of the reflection plate 13 and pass through the second focus R of the second elliptical portion 13d.

Optical paths of light rays emitted from the fluorescent lamp 11 are described with reference to FIG. 7. In FIG. 7, both the first focuses 0 of the first and second elliptical portions 13c and 13d of the reflection plate 3 are disposed at the center of the fluorescent lamp 11. The second focuses S and R of the first and second elliptical portions 13c and 13d are respectively disposed at positions in the vicinity of the first and second straight portions 13a and 13b of the reflection plate 13 and between the fluorescent lamp 11 and the first and second straight portions 13a and 13b.

By such a configuration, light rays emitted from the fluorescent lamp 11 and directed to the first and second elliptical portions 13c and 13d of the reflection plate 13 are reflected by the first and second elliptical portions 13c and 13d, and pass in the vicinity of the second focuses S and R. That is, most of the light rays emitted from the fluorescent lamp 11 and directed away from the light guide member 12 do not re-enter into the fluorescent lamp 11, and are reflected by the first and second elliptical portions 13c and 13d so as to be directed toward the light guide member 12.

In the above-mentioned second embodiment of the back light illuminator of this invention, the first and second elliptical portions 13c and 13d are formed on the reflection plate 13, so that the light emitted from the fluorescent lamp 11, which is a linear light source, are incident on the incident face 14a of the incident portion 14 of the light guide member 12 without being absorbed by fluorophor of the fluorescent lamp 11. Consequently, high-luminance of the back light illuminator is realized. Alternatively, when the luminance of the back light illuminator is fixed, the consumption of electric power is reduced, arid the back light illuminator can be used for a long time.

Furthermore, in the second embodiment, instead of the first and second straight portions 13a and 13b of the reflection plate 13, parabolic portions, elliptical portions or hyperbolic portions can be formed.

In the first and second embodiment, the fluorescent lamps 1 and 11 are used as the linear light source. However, an incandescent lamp, light emitting diode or organic emitter can be used instead of the fluorescent lamp. Furthermore, polycarbonate is used as the material of the light guide members 2 and 12. However, another transparent material such as glass can be used as a material of the light guide members 2 and 12.

Furthermore, in order to increase the luminance of the back light illuminator, it is preferable that grooves be formed on a front or rear surface of the light guide members 2 and 12.

Furthermore, the cross-section of the fluorescent lamps 1 and 11 are illustrated as circular in the figures. However, it is preferable that the cross-section of the fluorescent lamps 1 and 11 be formed as a rectangular shape or an elliptical Shape.

Furthermore, the materials of the reflection plates 3 and 13 are not restricted. A sheet or plate material having a high reflectance can be used.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A back light illuminator for a liquid crystal display apparatus, comprising:

a linear light source;

a light guide member for directing light emitted from the linear light source toward a liquid crystal display panel and comprising an incident portion at which light from the light source enters the light guide member, the light source being disposed to face the first face of the incident portion of the light guide member; and a reflection plate for reflecting light from the light source to the incident portion of the light guide member, the reflection plate comprising a curved portion configured and positioned so that light rays from the light source reflected by the curved portion pass by the light source, wherein the first face and the second face of the incident portion of the light guide member are oriented at a first angle in a range of 5 to 30 degrees.

2. The back light illuminator in accordance with claim 1, wherein the curved portion of the reflection plate has a parabolic cross-section or an elliptical cross-section.

3. The back light illuminator in accordance with claim 2, wherein the incident portion of the light guide member is wedge-shaped and has a first face and a second face oriented at an acute angle with respect to the first face; and the reflection plate has a parabolic portion having a parabolic cross-section for reflecting light emitted from the light source toward the first face of the incident portion of the light guide member.

4. The back light illuminator in accordance with claim 3, wherein symmetry axis of the parabolic portion of the reflection plate and the normal on the first face of the incident portion of the light guide member intersect at a second angle in a range of 5 to 30 degrees.

5. The back light illuminator in accordance with claim 3, wherein, when the first angle between the first face and the second face is $\theta$, the second angle between the symmetry axis of the parabolic portion and the normal on the first face is $\phi$, and the refraction index of light of a material of the light guide member is n, $$\sin\phi > n \times \sin(\sin^{-1}(1/n) - 2\theta)$$

is satisfied.

6. The back light illuminator in accordance with claim 3, wherein the reflection plate is positioned so that the focus of the parabolic portion of the reflection plate is disposed at the center of the light source.

7. The back light illuminator in accordance with claim 3, wherein protrusions are provided on a surface of the light guide member or the reflection plate facing the light source so as to protrude toward the light source.

8. The back light illuminator in accordance with claim 2, wherein the light source is disposed for facing the center of an incident face of the light guide member; the reflection plate has a pair of elliptical portions formed substantially symmetrical to the perpendicular at the center of the incident face of the light guide member for reflecting the light emitted from the light source toward the incident face of the light guide member; and each of the elliptical portions has a cross-section formed by a curve constituting an ellipse and the major axis of the ellipse is substantially parallel to the the incident face of the light guide member.

9. The back light illuminator in accordance with claim 8, wherein the elliptical portions are positioned so that a first focus of each elliptical portion be disposed at the center of the light source and a second focus of each elliptical portion is disposed outside the light source.

10. The back light illuminator in accordance with claim 8, wherein protrusions are provided on a surface of the light guide member or the reflection plate facing the light source so as to protrude toward the light source.

* * * * *